United States Patent
Yamasaki et al.

(10) Patent No.: US 7,139,583 B2
(45) Date of Patent: Nov. 21, 2006

(54) POSITIONING SYSTEM AND METHOD BASED ON TIME DIFFERENCE OF ARRIVAL

(75) Inventors: Ryota Yamasaki, Kokubunji (JP); Atsushi Ogino, Kodaira (JP); Masaaki Shida, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 216 days.

(21) Appl. No.: 10/753,443

(22) Filed: Jan. 9, 2004

(65) Prior Publication Data
US 2004/0157621 A1   Aug. 12, 2004

(30) Foreign Application Priority Data
Feb. 7, 2003   (JP) .............................. 2003-030281

(51) Int. Cl.
  *H04Q 7/20*   (2006.01)
(52) U.S. Cl. ............................... 455/456.1; 455/456.2; 455/426.1
(58) Field of Classification Search ............. 455/456.1, 455/103; 342/387; 375/343
  See application file for complete search history.

(56) References Cited

U.S. PATENT DOCUMENTS 6,393,261 B1 *   5/2002   Lewis ......................... 455/103

2003/0001776 A1 *   1/2003   Hannah et al. ............. 342/387
2004/0170237 A1 *   9/2004   Chadha et al. ............. 375/343
2004/0203870 A1 *   10/2004   Aljadeff et al. .......... 455/456.1

FOREIGN PATENT DOCUMENTS

| JP | 3127220 | 3/1997 |
| JP | 2001-147261 | 11/1999 |
| JP | 2001-311767 | 4/2000 |

\* cited by examiner

*Primary Examiner*—Jean Gelin
*Assistant Examiner*—Phuoc Doan
(74) *Attorney, Agent, or Firm*—Reed Smith LLP; Stanley P. Fisher, Esq.; Juan Carlos A. Marquez, Esq.

(57) ABSTRACT

In a positioning system using the time difference of arrival of signals between a station and a plurality of access points, each of the access points repeatedly measures a signal for calculating a position from the station, while changing any of time, the position of the station, and a frequency in use, and accumulates a plurality of measurement data. A position calculation server determines a given timing on each of a plurality of delay profiles created based on the measurement data obtained from the access points as a reception timing sample for the signal, performs a combination process with respect to the plurality of reception timing samples, and determines one reception timing for each of the access points. The position calculation server calculates the time difference of arrival of signals between the station and the access points based on the reception timings and calculates the coordinates of the position of the station.

6 Claims, 19 Drawing Sheets

POSITIONING SYSTEM AND METHOD BASED ON TIME DIFFERENCE OF ARRIVAL

BACKGROUND OF THE INVENTION (1) Field of the Invention

The present invention relates to a method for positioning a station by using the time difference of arrival of radio waves in a wireless communication system.

(2) Description of the Related Art

In a method for sensing the position of a mobile terminal station by using the time difference of arrival of radio signals, an error contained in the result of positioning the station is increased disadvantageously unless the time difference of arrival of the signals at individual access points (wireless base stations) is measured as precisely as possible.

In an ideal environment, a signal reception timing can be estimated with high accuracy since the waveform configuration of a correlation value used to measure the time difference of arrival of signals is close to that of a theoretical value. In an actual situation, however, an error factor such as attenuation, thermal noise, or multipath is caused by ambient conditions including a geographical environment, a temperature variation, and a surrounding radio-wave environment and the configuration of the correlation waveform of a received signal is distorted so that there are cases where the reception timing is estimated erroneously. In particular, the multipath is a major factor causing the degradation of positioning accuracy since it is difficult to analytically respond to a dynamic change in the geographical environment.

As an example of a technology for improving range finding accuracy when the multipath is a major error factor in a range finding process, there is a method disclosed in Japanese Unexamined Patent Publication No. HEI 10-246764 (Japanese Patent No. 3127220: Patent Document 1). According to the invention disclosed in Patent Document 1, GPS positioning is performed at each of auxiliary observation points provided in the vicinity of two observation points to allow accurate measurement of the distance between two points by using a GPS, respective distance vectors are determined from a plurality of results of positioning that have been obtained, and the plurality of results are averaged, whereby the influence of the multipath is reduced and accurate measurement of the distance between the two points is enabled.

A description will be given to the method with reference to FIG. 16. In the measurement of the distance between observing points A and B, auxiliary observing points B1, B2, and B3 are placed in the vicinity of the observing point B and the respective auxiliary vectors b1, b2, and b3 thereof are predetermined. Likewise, auxiliary observing points A1, A2, and A3 are also placed in the vicinity of the observing point A and GPS positioning is performed at each of the observing points. By using the results of positioning thus obtained and the foregoing auxiliary vectors b1, b2, and b3, provisional baseline vectors aib1, aib2, and aib3 (i=1 to 3) extending from the observing point A to the observing point B are calculated and the results are averaged, whereby a baseline vector extending from the observing point A to the observing point B is determined.

In a method disclosed in Japanese Unexamined Patent Publication No. 2001-311767 (Patent Document 2), it is determined whether each of signals received from GPS satellites is a direct wave or a reflected wave and positioning calculation is performed by using only the GPS satellite from which the signal determined to be a direct signal has been received. A description will be given to a method for determining a direct wave or a reflected wave. A positioning system is composed of a first antenna and a second antenna with directionality. Information on a GPS satellite A is acquired by using the first antenna and the second antenna is oriented in the direction of the captured GPS satellite. If a signal from the GPS satellite A captured by the first antenna is receivable by the second antenna, the signal is determined to be a direct wave. If the second antenna can not receive the signal from the GPS satellite A, it is determined to be a reflected wave.

In Japanese Unexamined Patent Publication No. 2001-147261 (Patent document 3), a distance is sensed by performing communication between two communication stations by using signals at different frequencies, calculating the respective arrival times thereof, performing the determination of a direct wave or a reflected wave from the results, and selecting the direct wave.

SUMMARY OF THE INVENTION

Thus, in a positioning system using a signal reception timing in a wireless communication system, the multipath caused by an obstacle present between communication stations or the like becomes a major error factor. Since it is generally difficult to use an analytical approach with respect to such a geographical environment and a change therein, a statistic method has been used primarily. In a positioning system using signal intensities, a method for improving positioning accuracy by averaging the signal intensities has been devised but there has been no conventional method which uses a statistic process to measure the time difference of arrival between a station and access points with high accuracy.

The present invention has been proposed in view of the foregoing technical background. In accordance with the present invention, improved positioning accuracy is achievable in a positioning system which performs the positioning of a terminal station by using the time difference of arrival of signals.

To solve the foregoing problems, the present invention has devised a method for improving positioning accuracy. To achieve improved positioning accuracy, it is necessary to improve the accuracy with which a signal reception timing between a station and access points is measured. As a major factor which degrades the accuracy with which the reception timing is measured, however, the presence of the multipath can be mentioned. The influence of the multipath is changed irregularly by dynamic factors such as the environment in which a positioning system is disposed and a human and various other factors such as time and temperature so that it is generally difficult to take analytical measures.

Therefore, the positioning method using the time difference of arrival of signals according to the present invention enhances the accuracy with which the time difference of arrival between a station and access points is measured by accumulating a plurality of reception timings for measurement signals which have passed through different propagation environments, performing a statistic process with respect to the plurality of reception timing samples, and creating a higher-accuracy timing value. To vary the propagation environment, measurement is performed while varying parameters such as time, position, or frequency in such a manner as to perform the measurement while slightly changing the position of an antenna at an access point or the position of a station or perform the measurement while changing the radio frequency used for positioning. Since the distribution of positioning errors caused by the multipath is not normal in most cases, positioning accuracy can further be improved by performing a proper process such as the use of a deviation in accordance with the environment in which the positioning system is disposed or the use of signal intensity information.

DESCRIPTION OF THE PREFERRED EMBODIMENTS

An embodiment of a positioning system according to the present invention will be described herein below.

Figure 1:
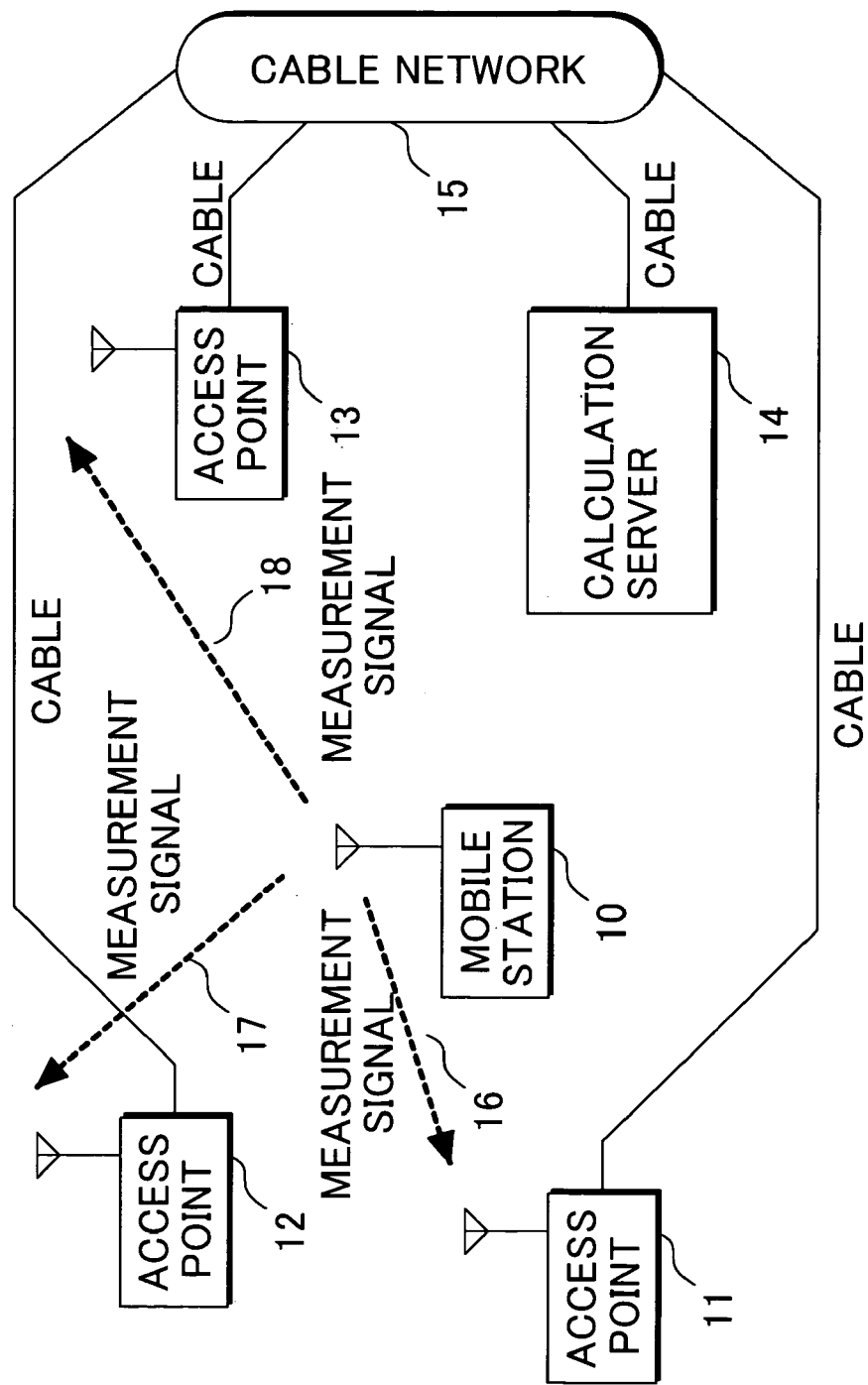
FIG. 1 is a view showing an entire positioning system.

FIG. 1 is a view showing an entire positioning system for sensing the position of a mobile station (wireless terminal). The positioning system is comprised of a plurality of access points (wireless base stations) 11, 12, and 13 and a calculation server 14. Each of the access points and the calculation server are connected to each other by a cable network 15. The purpose of the positioning system according to the present invention is to calculate the coordinates of the position of a station 10 using this wireless communication system.

In the positioning system, the positioning of the station is performed by using the time difference of arrival of measurement signals transmitted and received between the station and the access points To obtain an absolute time of signal arrival, it is necessary for a clock for the station and respective clocks for the access points to be in synchronization. Since the station and the access points are asynchronous in a typical wireless communication system, positioning using the absolute time of arrival (TOA) cannot be performed. If the clocks for a plurality of access points are synchronized, however, the difference between times required by measurement signals from the station to reach the individual access points can be determined, thereby to allow positioning using a relative time of arrival (TDOA: Time Difference Of Arrival).

As an example of a method for synchronizing a plurality of access points, there is one in which each of the access points receives a synchronization signal transmitted by a GPS and synchronizes the clock with the received synchronization signal. The method is used to provide synchronization between access points in a CDMA communication system or the like. Another method is disclosed in Japanese Patent Application No. 2002-260772 that has already been filed by applicants including one of the present inventors.

Figure 17:
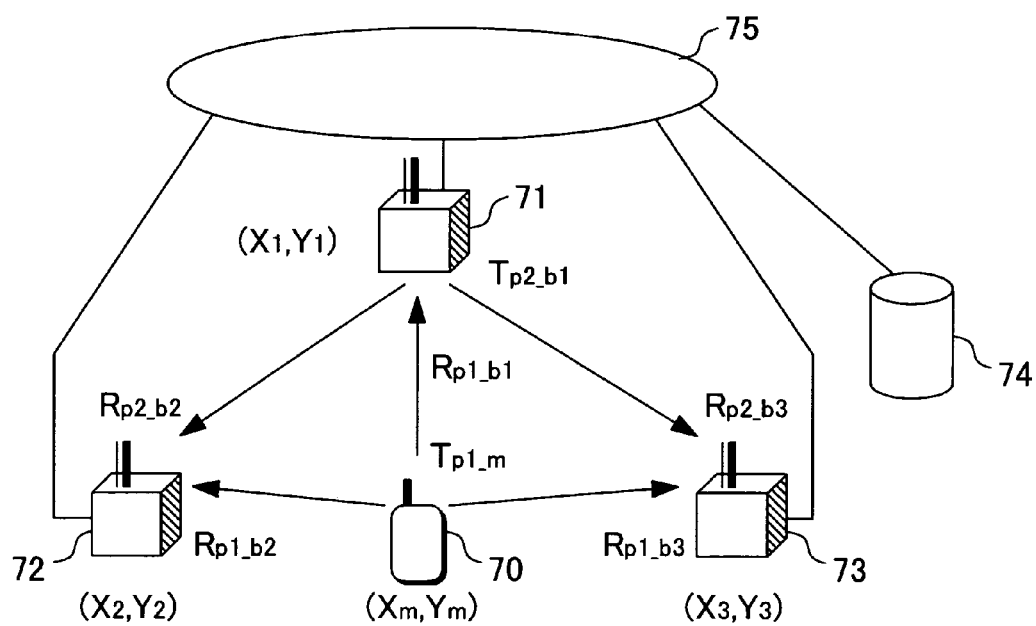
FIG. 17 is a view showing an example of a procedure for providing synchronization between access points.

In the wireless LAN system shown in FIG. 17, if a server 74 transmits a clock error $E_{b1\_bi}$ (i=2, 3) calculated from Numerical Expression 1 to each of access points 72 and 73 and each of the access points 72 and 73 compensates for the clock error, the access points 72 and 73 can be synchronized with the access point 71.

$$E_{b1\_bi} = R_{p2\_bi} - T_{p2\_b1} - c^{-1}\sqrt{(X_i-X_1)^2 + (Y_i-Y_1)^2}\ (\text{Numerical Expreesion 1})$$

By providing synchronization between the individual access points by using any means as shown in the foregoing example, the positioning of the station using the TDOA technology can be performed. In the TDOA positioning, the station transmits a measurement signal which is received by each of the access points, the time difference of arrival is determined by using a reception timing at each of the access points, and positioning calculation is performed. To improve positioning accuracy for the station, it is important to precisely measure the reception timing at each of the access points.

As a method for measuring the reception timing, the following method has been known.

Figure 4:
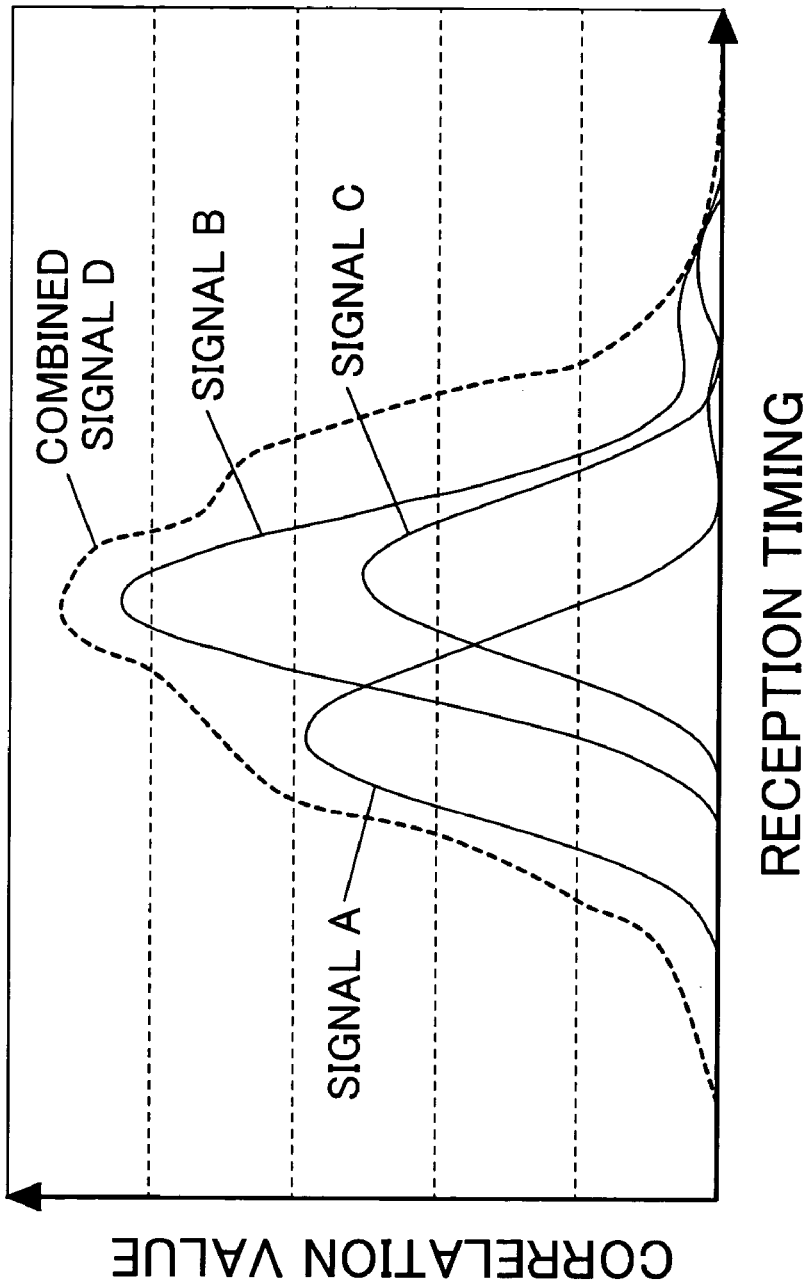
FIG. 4 is a view showing an example of a correlation waveform for timing measurement.

The correlation value between a predetermined code sequence used to generate a spread spectrum signal and a received signal is calculated with each of slightly shifted timings to create a profile (hereinafter referred to as a delay profile) showing a value corresponding to the correlation value between the code sequence and the received signal a teach of the timings. Examples of the delay profile are shown in FIG. 4. In each of the delay profiles, the timing which maximizes the correlation value is defined as the signal reception timing. In accordance with the method for determining the reception timing described above, however, a timing estimation error occurs in a multipath environment involving the generation of a diffracted wave, a reflected wave, and the like.

If the signal A is a direct wave in FIG. 4, the multipath causes delayed waves such as the signals B and C so that the combined wave D is observed resultantly. The reception timing corresponding to the crest of the combined wave D is delayed from the reception timing for the signal A, which is the reception timing for the direct wave, so that the error therebetween becomes a reception timing measurement error.

As a method for solving the foregoing problem, procedures for positioning a station according to the present invention will be described with reference to FIGS. 1 and 5. It is assumed that a description given herein below is based on the following conditions.

1. A plurality of access points have been synchronized preliminarily by any means.

2. The number of times the reception timing is measured is m (m is an integer not less than 1).

First, in a procedure 100, a measurement signal transmitted from the station 10 is received by each of the access points 11, 12, and 13, transmitted to the calculation server 14 via the cable network 15, and accumulated therein. If measurement is performed continuously, a propagation environment through which the measurement signal passes is changed in a procedure 103. Specifically, any of the time, the position of the station, and the frequency is changed. To change the time, the station may repeatedly transmit the measurement signal at an arbitrary time interval. To change the position, a human or holder holding the station may move the position of the station by a distance equal to or more than half the wavelength of a radio frequency in use. To change the frequency, the calculation server may issue an instruction to change the frequency to each of the access points and the station used for the measurement, thereby changing the frequency channel in use. If the measurement is performed m times, the program sequence advances to the next procedure.

In a procedure 101, the calculation server 14 performs a correlation calculation process for the m measurement signals having been transferred to create m delay profiles. In a procedure 102, a given timing on each of the delay profiles is determined as a signal reception timing sample. After m reception timing samples are measured, the calculation server performs a combination process in a procedure 104, thereby determining one combined reception timing.

An advantage offered by a structure in which the calculation server performs the procedures 101, 102, 103, and 104 is the simplification of a process at each of the access points, which achieves a reduction in the cost for constructing the access point. The foregoing process flow is executed for each of the access points 11, 12, and 13 so that one combined reception timing is determined eventually for each of the access points 11, 12, and 13. The calculation server determines any of the combined reception timings for the respective access points 11, 12, and 13 as a reference timing and calculates the time difference of arrival of the measurement signals transmitted from the station to the individual access points. The calculation server performs triangulation by using the time difference of arrival to calculate the coordinates of the position of the station.

Figure 5:
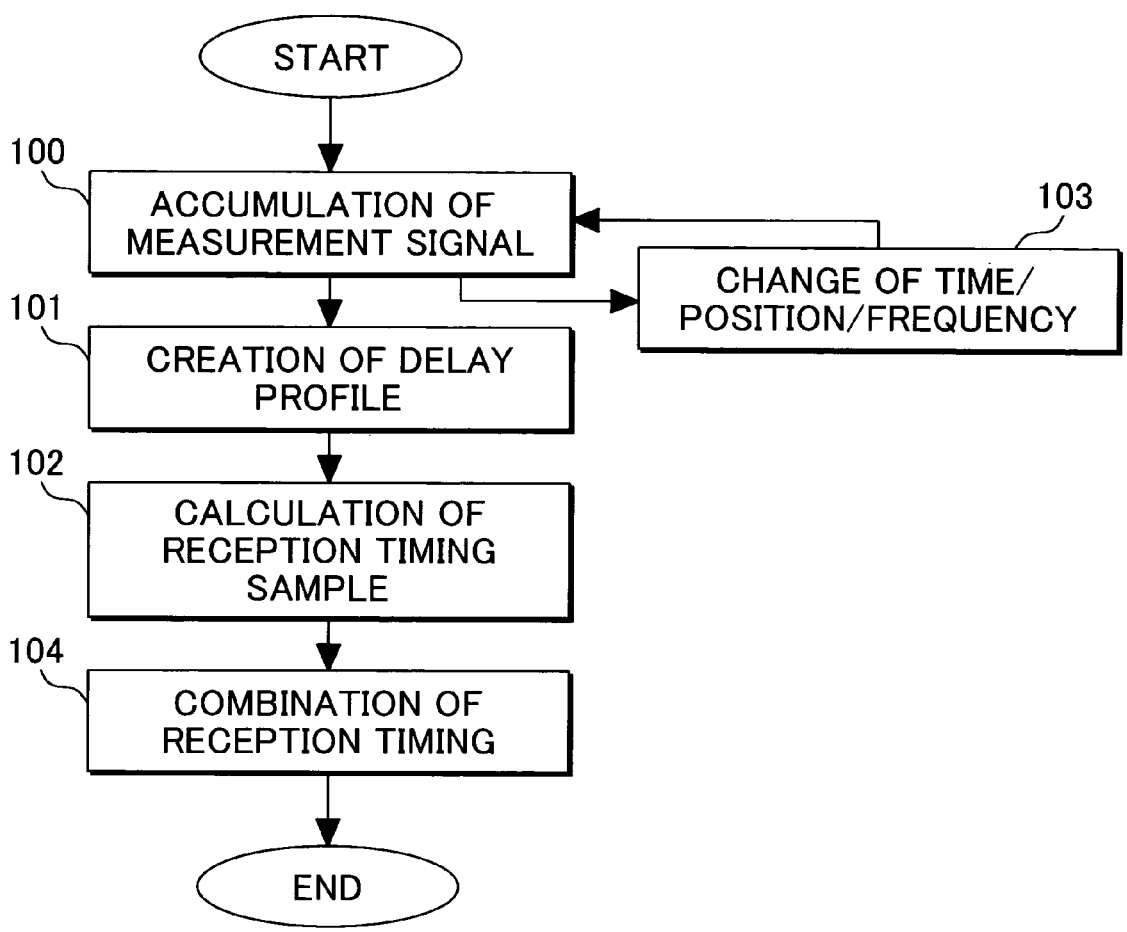
FIG. 5 is a view showing an example of a procedure for creating a reception timing.

In the procedures shown in FIG. 5, the access points may also be constructed to perform the procedures 100 and 101 (the accumulation of the measurement signals and the creation of the delay files). In that case, the process of performing the procedures 100 and 101 at the calculation server is no more necessary so that a processing burden on the calculation server is reduced. In that case, the access points transmit delay profile data to the calculation server.

The access points may also be constructed to perform the procedure 102 (the calculation of reception timing samples). In that case, it is no more necessary for the calculation server to perform the procedure 102 so that the processing burden thereon is reduced. Further, in that case, the access points transmit the reception timing samples to the calculation server so that communication traffic is also reduced. If the access points are constructed to perform the procedure 104 (a combination process performed with respect to the reception timing samples), it is no more necessary for the calculation server to perform the procedure 104 so that the processing burden thereon is reduced, further. In that case, each of the access points transmit one combined reception timing to the calculation server so that communication traffic is also reduced.

Figure 2:
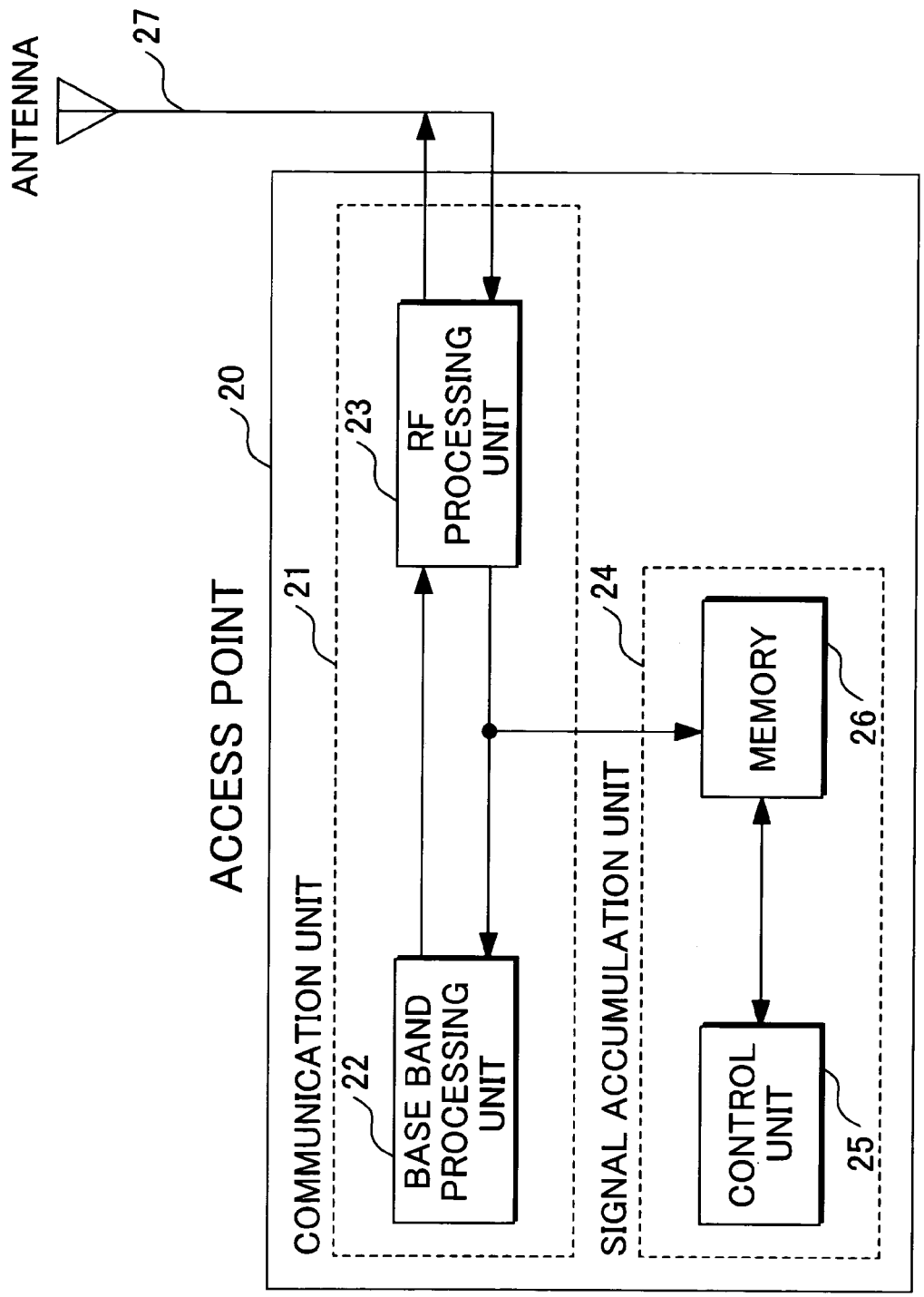
FIG. 2 is a view showing a structure of an access point.

A description will be given next to a structure of each of the access points with reference to FIG. 2. The access point includes two roughly divided blocks which are a communication unit 21 and a signal accumulation unit 24. The communication unit 21 is composed of a BB processing unit 22 for performing a base band process and an RF processing unit 23 for performing an RF process. A base band transmitted/received signal flowing between the BB processing unit 22 and the RF processing unit 23 is accumulated in the signal accumulation unit 24. The signal accumulation unit 24 is composed of a control unit 25 and a memory 26 and fetches the base band transmitted/received signal flowing in the communication unit into the memory 26. The signal is accumulated as data for measuring the reception timing samples. This corresponds to the procedure 100 shown in FIG. 5. The accumulated signal is sent to the calculation server in order to measure reception timing samples. It is also possible to prepare the memory 26 of a size sufficiently large to allow the accumulation of a plurality of signals and collectively transmit the plurality of signals to the calculation server.

Figure 20:
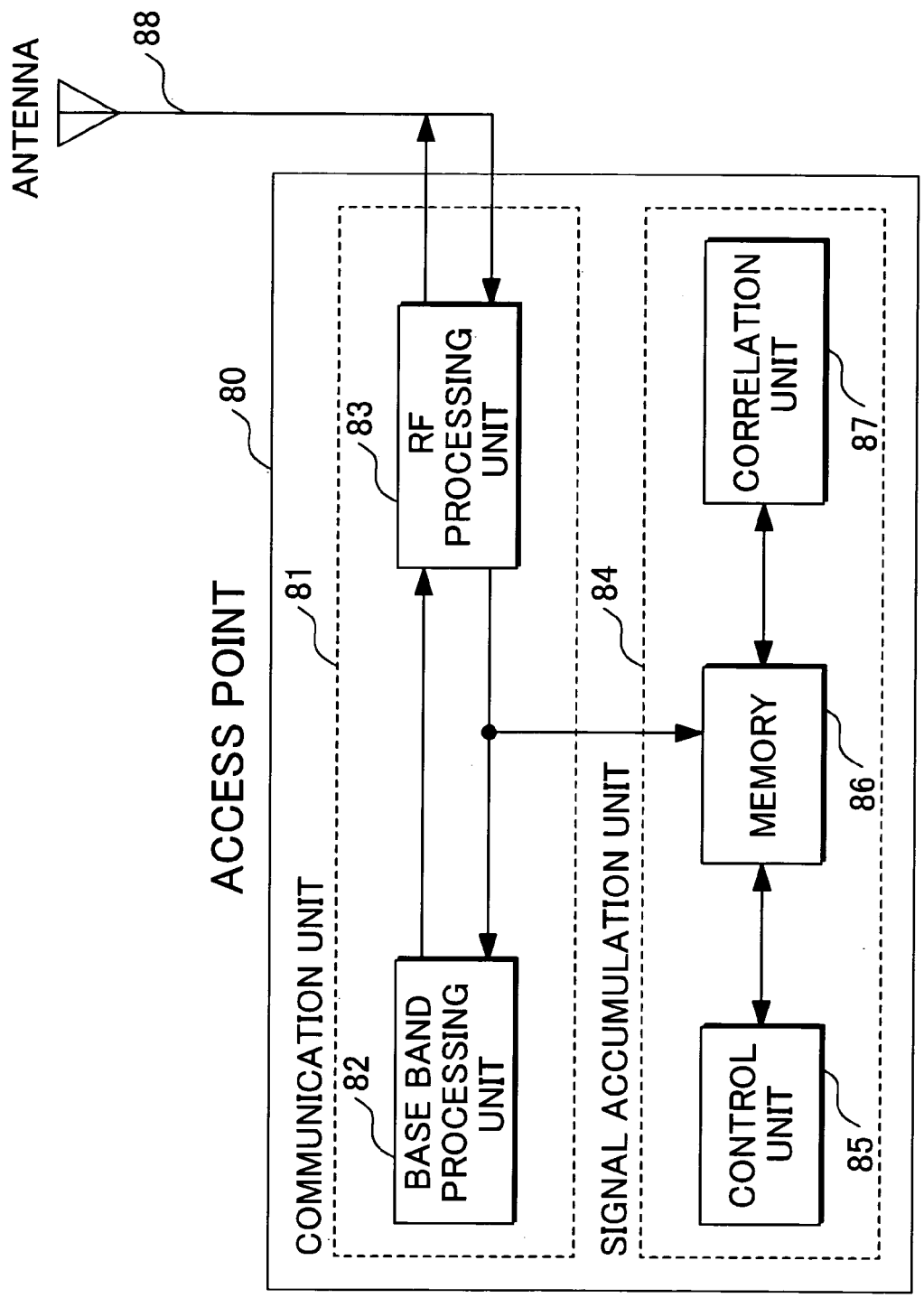
FIG. 20 is a view showing an example of a structure of an access point.

FIG. 20 shows a structure of each of the access points in the case where the procedures 101 and 102 are performed at the access point.

The access point includes two blocks which are a communication unit 81 and a signal accumulation unit 84. The communication unit 81 is composed of a BB processing unit 82 for performing a base band process and an RF processing unit 83 for performing an RF process. A base band transmitted/received signal flowing between the BB processing unit 82 and the RF processing unit 83 is accumulated in the signal accumulation unit 84. The signal accumulation unit 84 is composed of a control unit 85, a memory 86, and a correlation unit 87. The base band transmitted/received signal flowing in the communication unit is fetched in the memory 86. The procedure 101 is performed in the correlation unit 87, while the procedure 102 is performed in the control unit 85.

Figure 3:
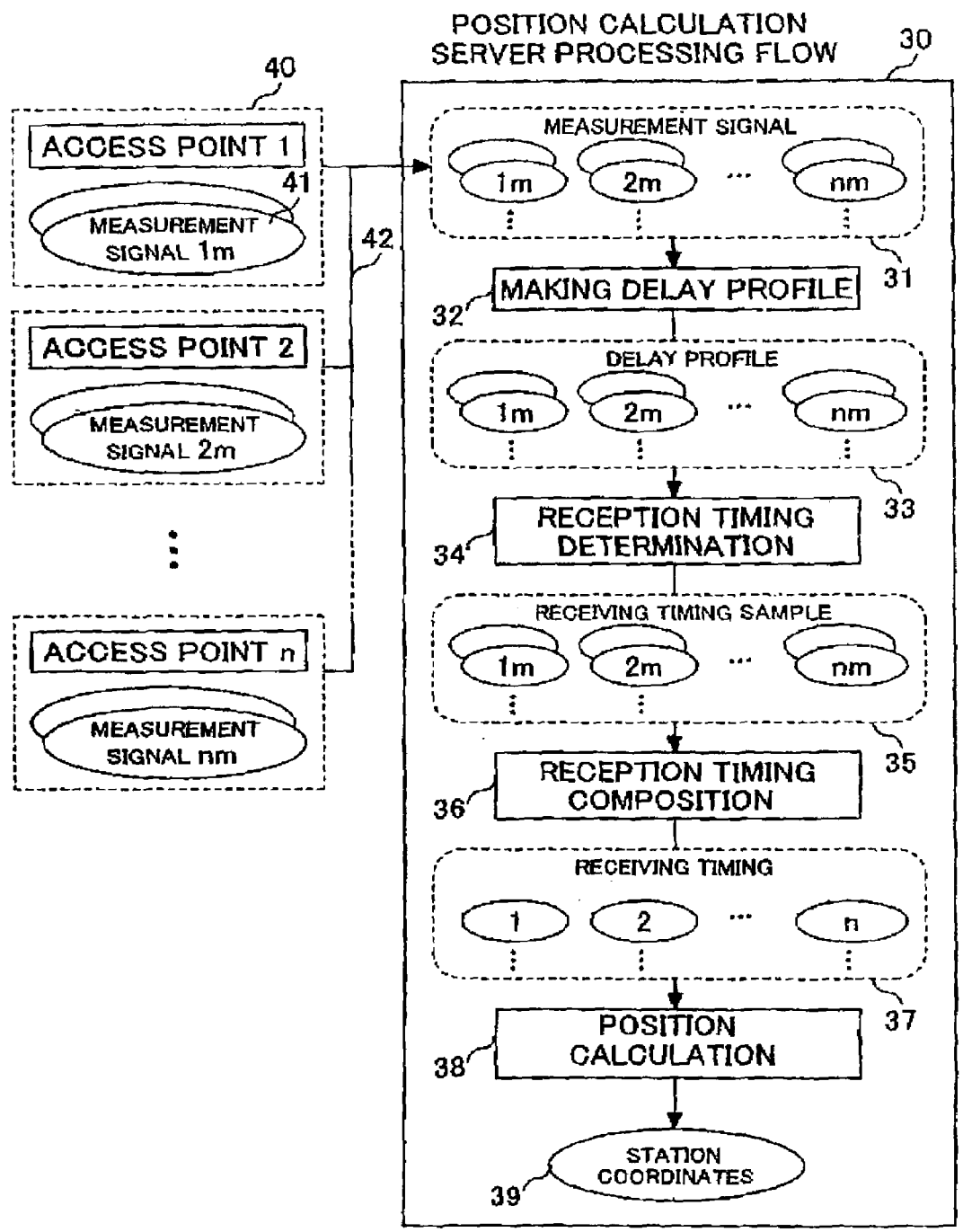
FIG. 3 is a view showing a process flow at a position calculation server.

A description will be given next to a process flow at the calculation server with reference to FIG. 3. The process which will be described below is performed by a CPU with respect to an inputted measurement signal based on a program stored in the memory of the calculation server. In the drawing, the sign n represents the number of access points in use and m represents the number of times of measurement. A process flow 30 at the calculation server can be executed by using, e.g., a general-purpose computer. The process flow 30 at the calculation server is comprised of a delay profile creation step 32, a reception timing determination step 34, a reception timing combination step 36, and a position calculation step 38.

The above flow will be described in detail by assuming that there are n access points. The m measurement signals acquired by each of the n access points through the m times of measurement are transmitted to the calculation server via a cable network 42. This corresponds to the procedure 100 in FIG. 5. The number of measurement signals 31 inputted in the process flow 30 at the calculation server is m×n (n: the number of access points).

In the delay profile creation step 32, n×m delay profiles 33 are created based on the measurement signals 31. This corresponds to the procedure 101 in FIG. 5. Subsequently, in the reception timing determination step 34, reception timing samples 35 are calculated for each of the n×m delay profiles 33. This corresponds to the procedure 102 in FIG. 5.

The n×m reception timing samples 35 thus obtained are subjected to a combination process for each of the access points in the reception timing combination step 36 to provide n combined reception timings 37. This corresponds to the procedure 104 in FIG. 5. The positioning calculation unit 38 calculates the time difference of arrival between the station and the access points by using the n combined reception timing 37 and calculates station coordinates 39. It is also possible to adopt a configuration which performs the step 32, the steps 32 and 34, or the steps 32, 34, and 36 at each of the access points.

A description will be given next to the individual embodiments of the combination process. It is assumed in the following examples that m reception timing samples are used to obtain one reception timing.

Figure 6:
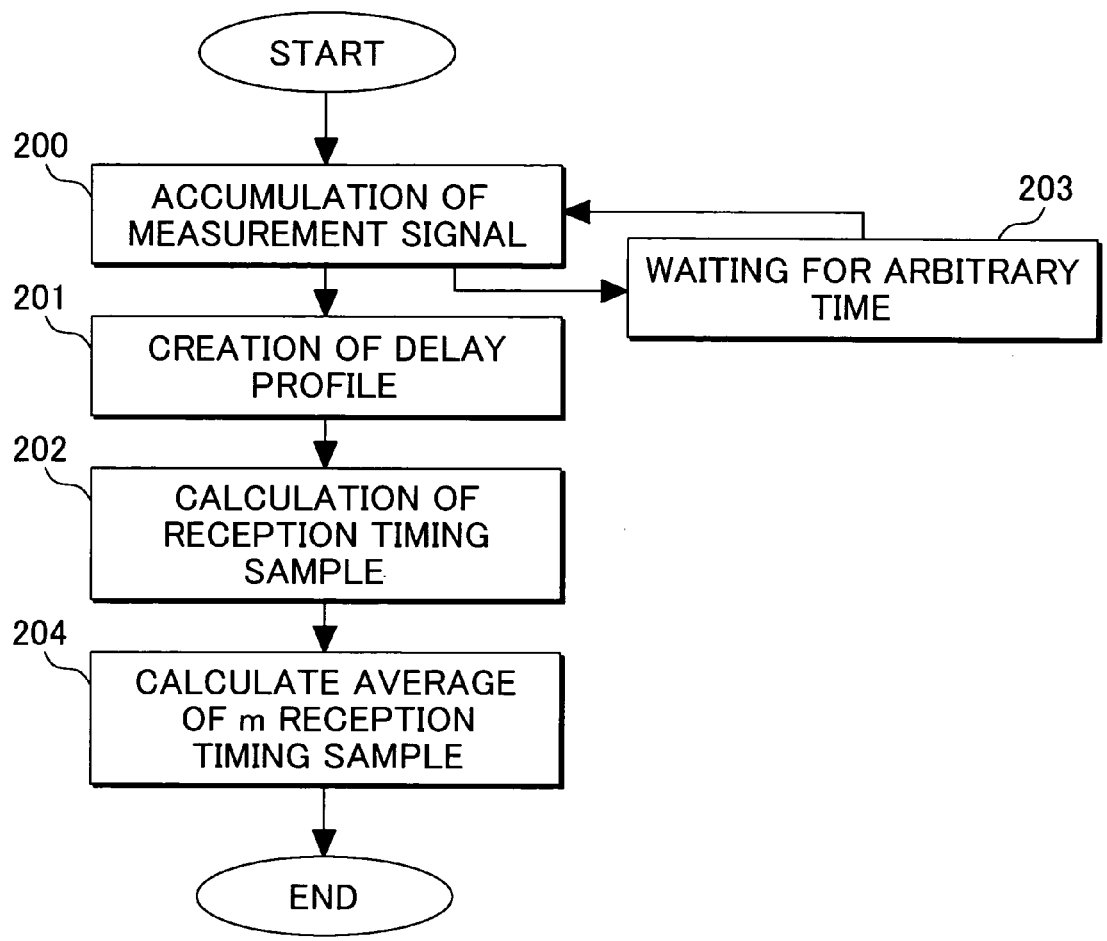
FIG. 6 is a flow chart of a time averaging process.

The process flow chart shown in FIG. 6 illustrates a combination method which averages the reception timing samples obtained from m times of measurement performed at arbitrary time intervals. Each of the access points accumulates measurement signals in Step 200. If the number of times of measurement is less than m, the program sequence advances to Step 203 where a reception timing sample is measured again after an arbitrary time interval. After the measurement is performed m times, a delay profile is created in Step 201 based on the measurement signals. Then, reception timing samples are measured in Step 202 based on the delay profile and the m reception timing samples are averaged in Step 204 to provide the result of the combination.

A description will be given next to the embodiment which repeatedly performs measurement, while gradually shifting the measurement position, and averages the results of measurement.

The measurement position can be shifted by preparing a plurality of antennas having different positions at each of the access points and switching the antenna in use. A proper interval between each of the antenna and an adjacent one can be calculated from the carrier frequency of a communication system. An example of the IEEE802.11b will be described herein below. The carrier frequency Fc of the IEEE802.11b is about 2.4 GHz. If the velocity of light (300,000 km/s) is represented by c, the wavelength can be derived from the numerical expression c/Fc. The wavelength of the IEEE802.11b derived from the numerical expression c/Fc is 12.5 cm. To achieve the effects of the present invention, the position of each of the antennas is preferably apart from an adjacent one by a distance equal to or more than half the wavelength. It will therefore be understood that the position of each of the antennas may be shifted appropriately by 6.25 cm or more.

Figure 10:
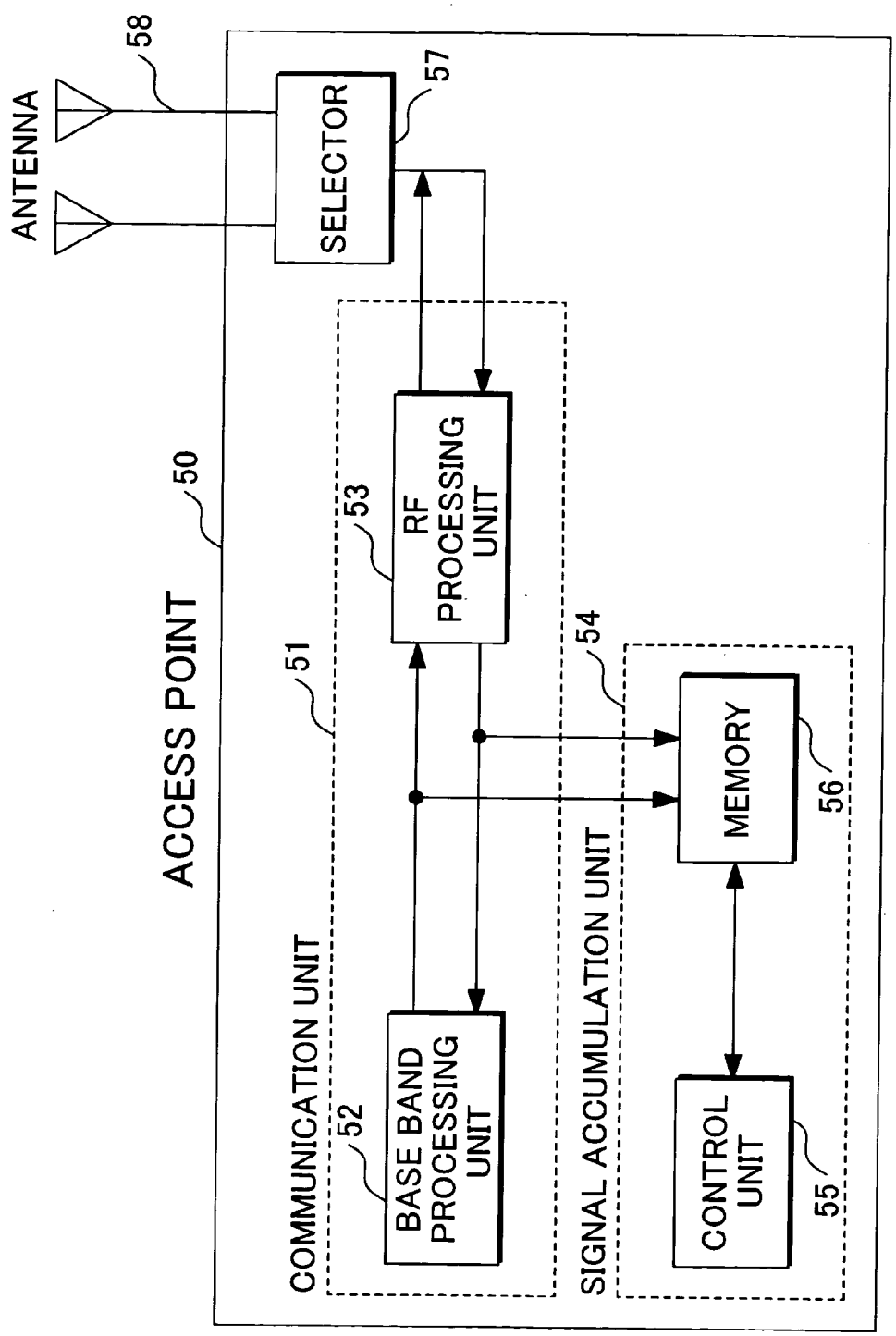
FIG. 10 is a view showing a structure of an access point in the position averaging process.

FIG. 10 is a structural view of an access point having two antennas. The access point 50 shown in FIG. 10 is structurally different from the access point shown in FIG. 2 in that it has a selector 57 for switching between the two antennas.

Figure 7:
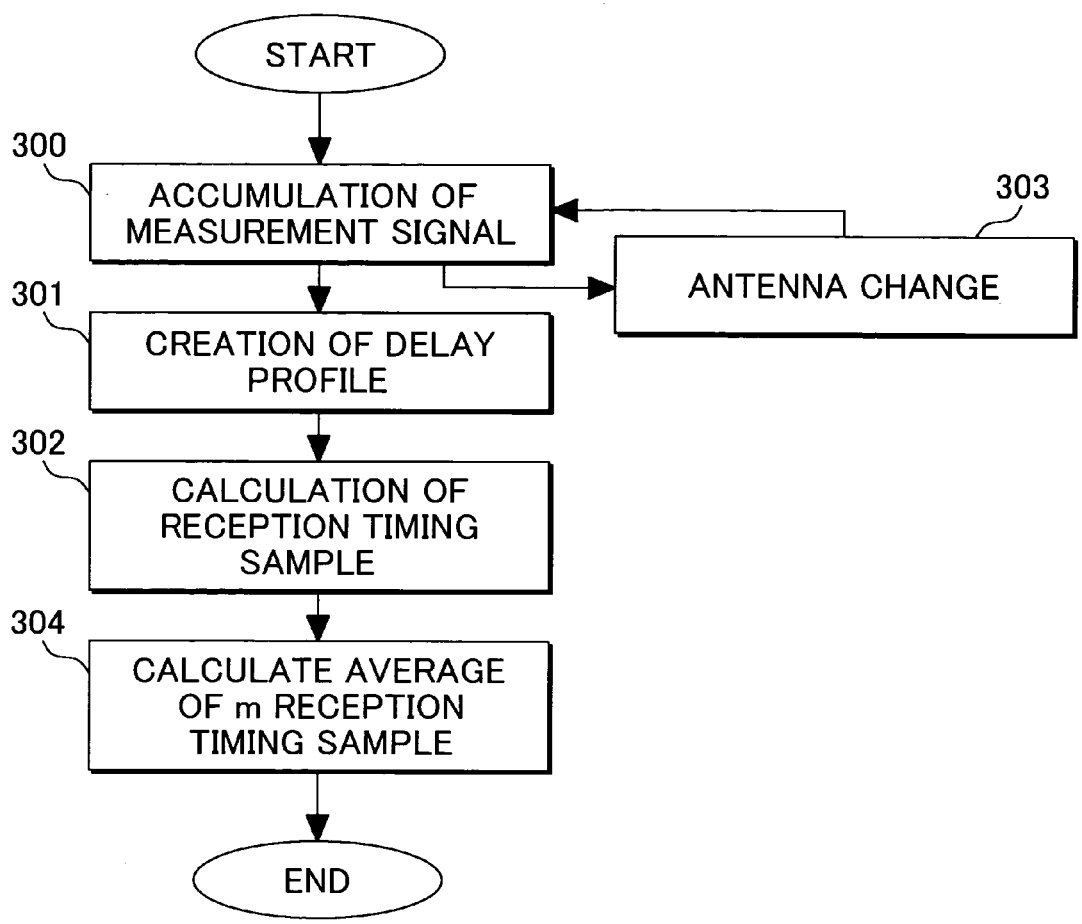
FIG. 7 is a flow chart of a position averaging process.

A description will be given to the process flow chart of FIG. 7. The access point accumulates measurement signals in Step 300. If the number of times of measurement is less than m, the sequence advances to Step 303 where the antenna in use is switched to the other. Thereafter, the measurement of reception timing samples is performed again. After the measurement is performed m times, a delay profile is created in Step 301 based on the measurement signals. Then, reception timing samples are measured in Step 302 based on the delay profile and the m reception timing samples are averaged in Step 304 to provide the result of the combination. The antenna selector need not necessarily be used in such an application that the movement of the position of the station in a short period of time can be expected. There can also be considered an embodiment in which the movement of the measurement position is realized at the station.

A description will be given next to the embodiment which performs measurement, while switching both of the time and the position, and averages the results of measurement.

Figure 8:
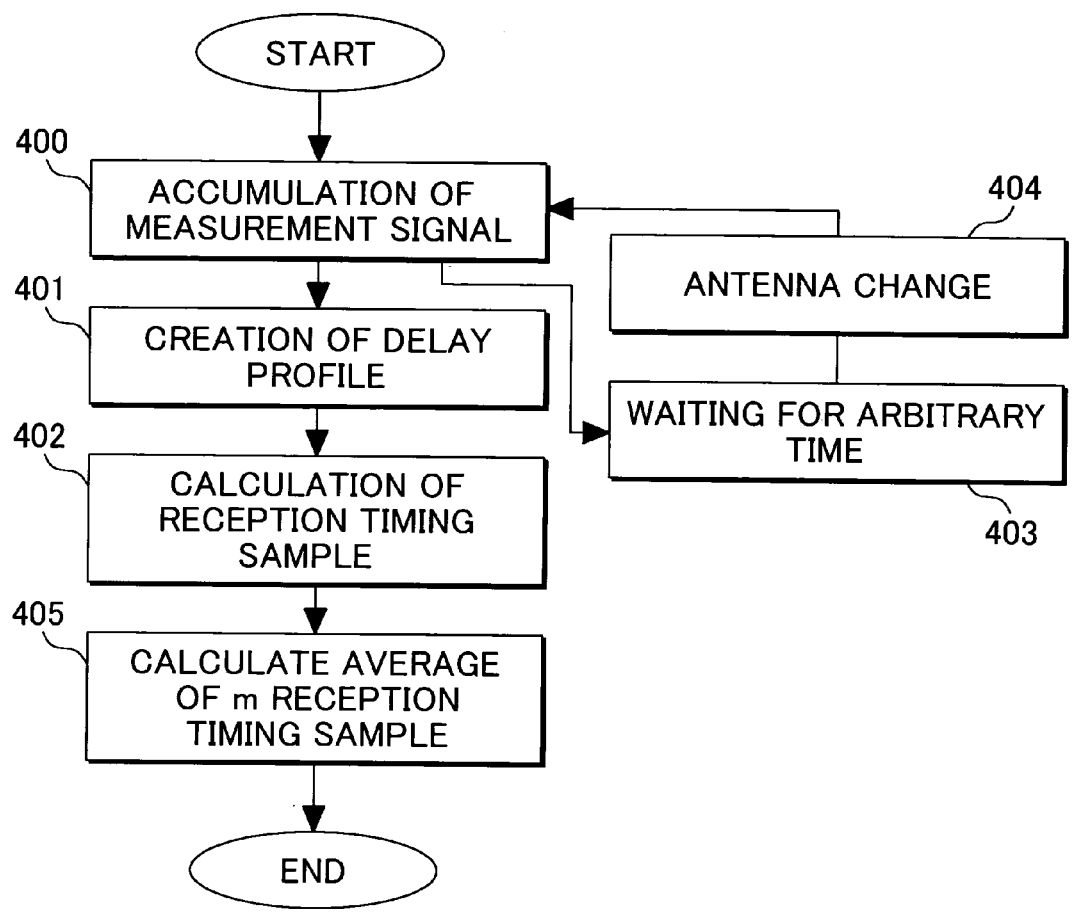
FIG. 8 is a flow chart of a time/position averaging process.

FIG. 8 is a process flow chart according to the present embodiment. Each of the access points accumulates measurement signals in Step 400. If the number of times of measurement is less than m, the sequence advances to Step 403 where an arbitrary time interval is allowed to elapse. Thereafter, the antenna in use is switched in Step 404 and the measurement of reception timing samples is performed again. After the measurement is performed m times, a delay profile is created in Step 401 based on the measurement signals. Then, reception timing samples are measured in Step 402 based on the delay profile and the m reception timing samples are averaged in Step 405 to provide the result of the combination.

A description will be given to the embodiment which performs measurement, while switching the frequency in use, and averages the results of measurement. In this case, a mechanism for controlling the switching of the frequency in use is necessary for each of the access points.

Figure 9:
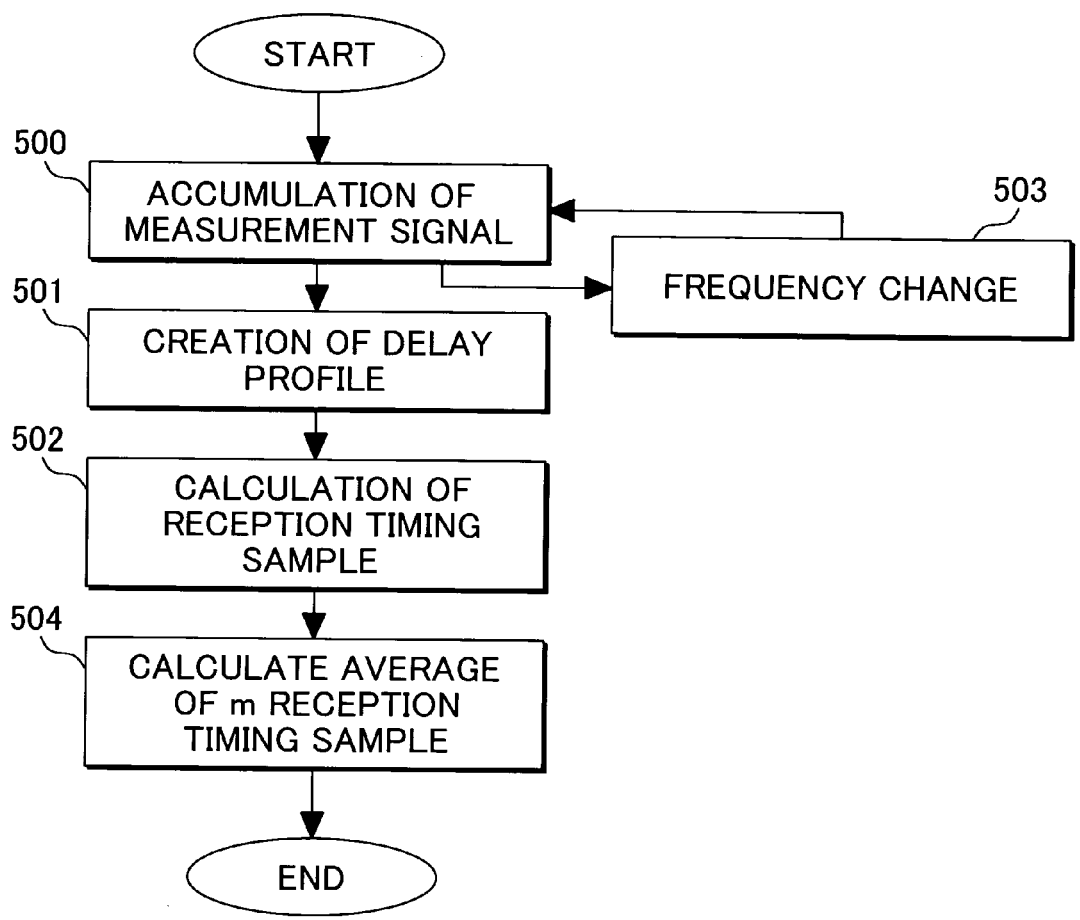
FIG. 9 is a flow chart of a frequency averaging process.
Figure 11:
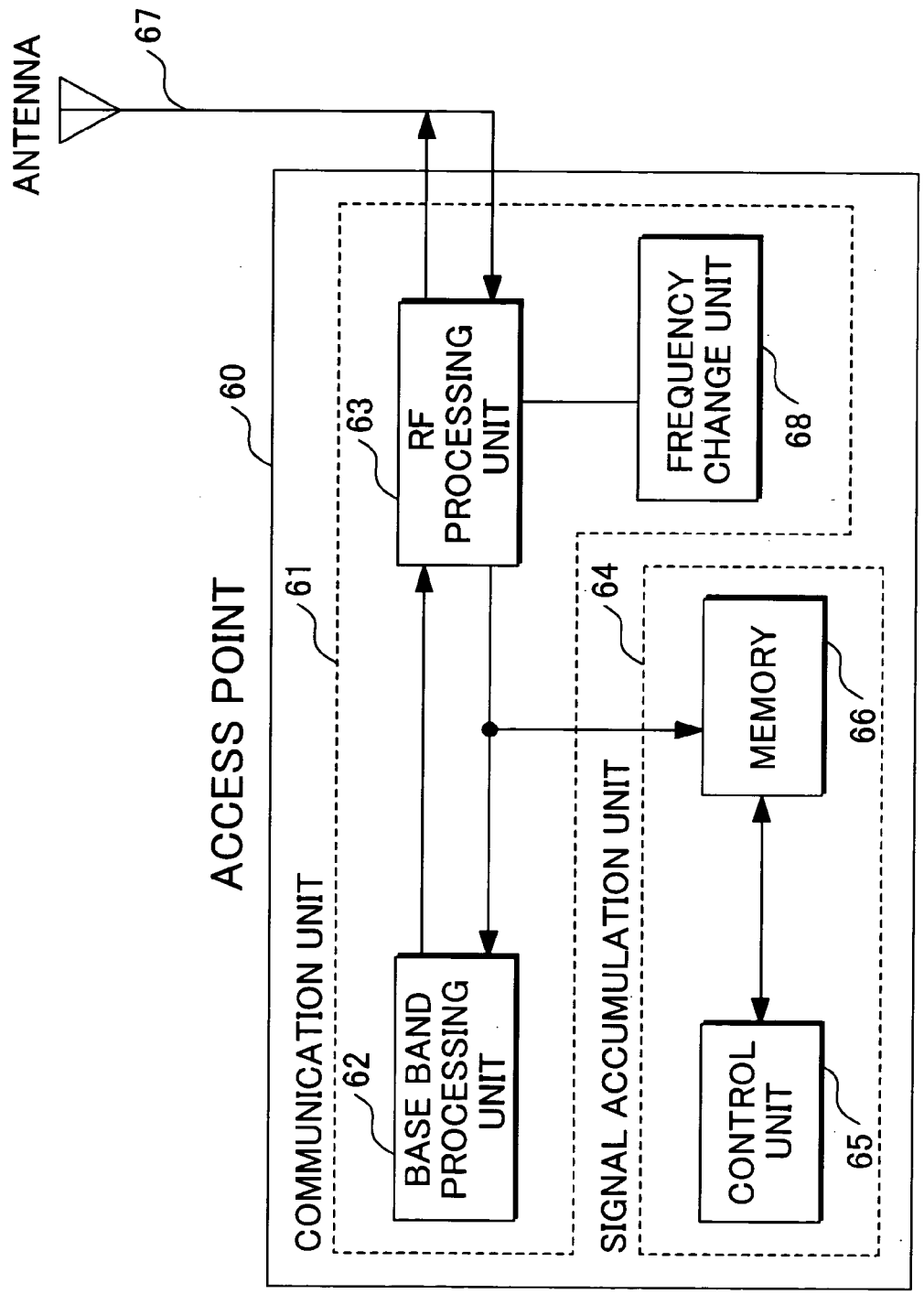
FIG. 11 is a view showing a structure of an access point in the frequency averaging process.

FIG. 11 is a structural view of an access point having a frequency switching mechanism. In the access point 60, a frequency change unit 68 is connected to an RF processing unit 63 to switch the frequency of the RF processing unit. In that case, a switching instruction is issued from the calculation server. The switching instruction is transmitted to the access point via the cable network and the access point switches the frequency in response to the switching instruction. FIG. 9 is a process flow chart in this case.

The access point accumulates measurement signals in Step 500. If the number of times of measurement is less than m, the sequence advances to Step 503 where the frequency used for the measurement of the position is switched. Thereafter, the measurement of reception timing samples is performed again. After the measurement is performed m times, a delay profile is created in Step 501 based on the measurement signals. Then, reception timing samples are measured in Step 502 based on the delay profile and the m reception timing samples are averaged in Step 504 to provide the result of the combination.

A description will be given next to the embodiment which performs a weighted averaging process in accordance with a signal level. To obtain a weight to be applied to each of measurement signals, the signal reception level is measured on receiving each of the measurement signals. There is a high probability that a signal on the high reception level is a relatively reliable signal such as a signal from a nearby access point or a direct wave. Therefore, a higher-precision positioning effect is achievable by adding a larger weight to a signal on a higher level and performing an averaging process considering the weight.

Figure 12:
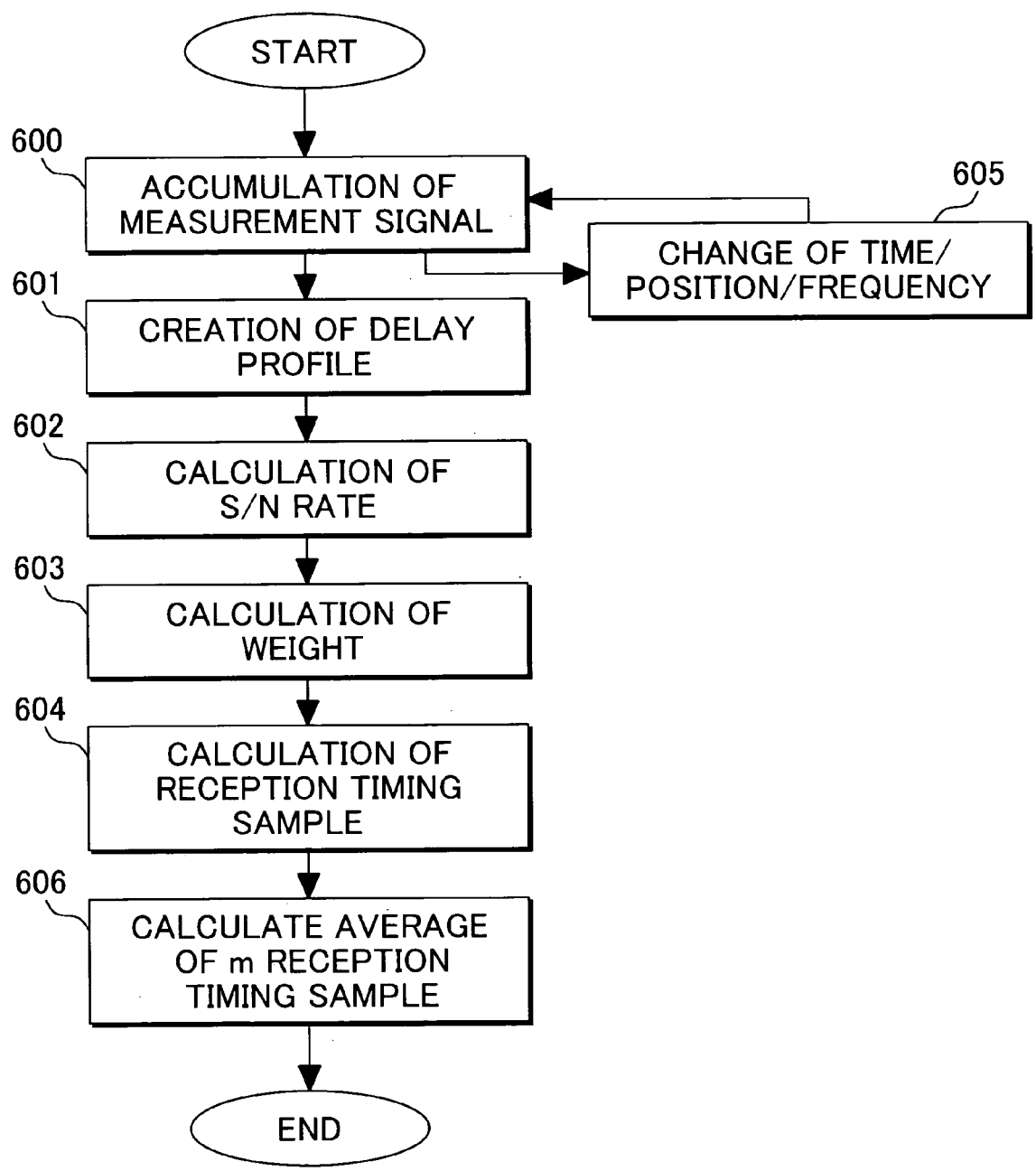
FIG. 12 is a flow chart of a process for weighting samples.

FIG. 12 is a flow chart of the process considering weighing. Each of the access points accumulates measurement signals in Step 600. If the number of times of measurement is less than m at this point of time, the sequence advances to Step 605 where the time, position, or the frequency in use is changed and then the accumulation of the measurement signals is repeated. After the measurement is performed m times, a delay profile is created in Step 601 based on the measurement signals and a signal to nose (S/N) ratio is calculated based on the delay profile in Step 602. Then, a weight is determined based on the S/N ratio in Step 603 and reception timing samples are measured in Step 604. Thereafter, the measurement of reception timing samples is performed again and the m weighted reception timing samples are averaged in Step 606 to provide the result of the combination.

As a combination method for the weighted averaging process, the embodiment which determines the weight based on the degree of similarity between the waveform configuration of a correlation value in a received signal and that of a correlation value in an ideal environment will be described. Since the configuration of the peak waveform varies depending on a multipath component contained in the received signal, it is a cause of a positioning error. If the received peak waveform is different in configuration from the peak waveform in the ideal environment, it follows therefore that the received signal contains the multipath component and a lot of positioning errors.

When it is described by referring to the flow chart, the correlation value between the waveform of the measured correlation value and the ideal waveform is determined in Step 602 of FIG. 12 and the weight is calculated based on the correlation value in Step 603.

Figure 13:
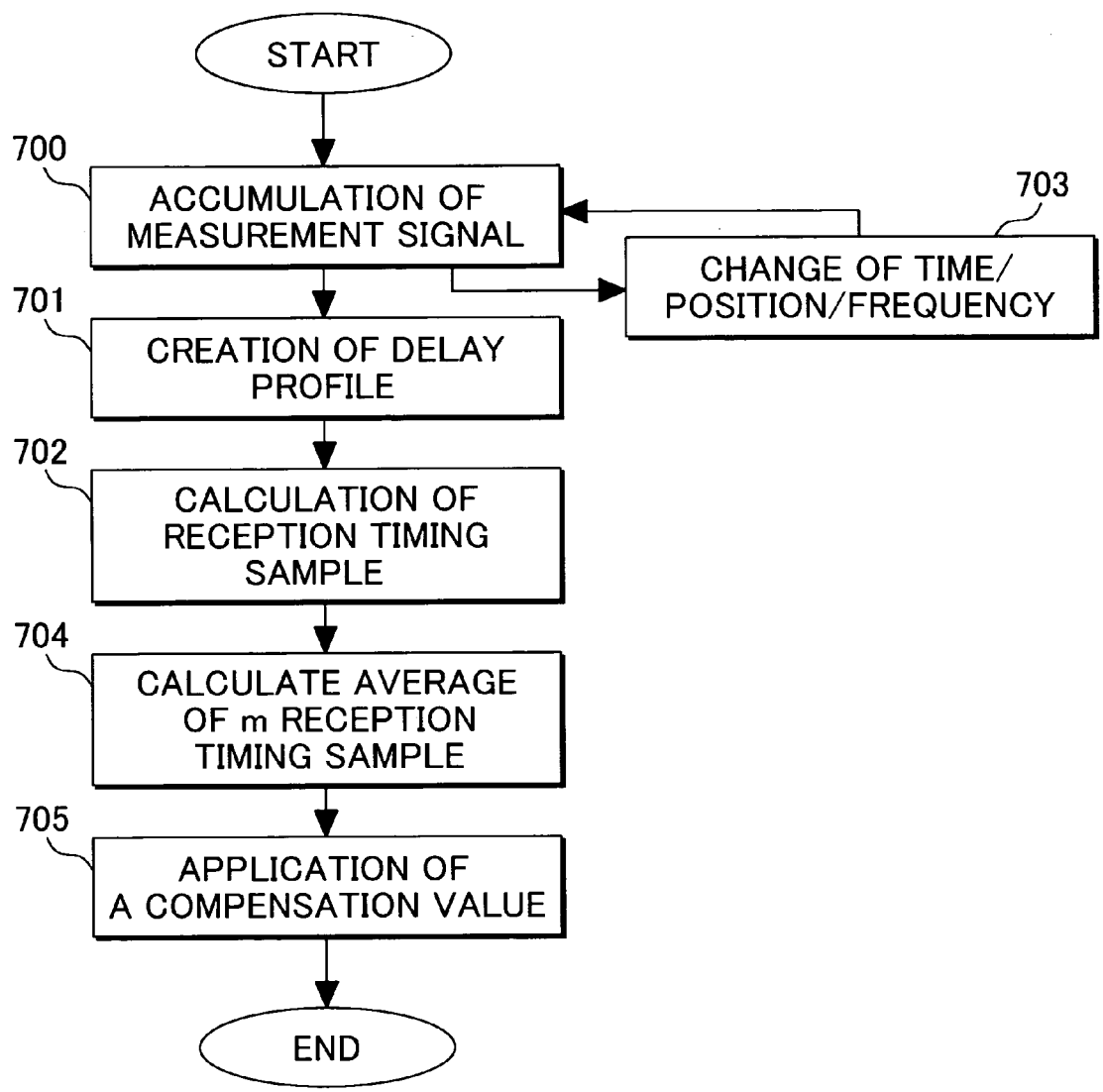
FIG. 13 is a flow chart of a process for performing compensation using a compensation value.

A description will be given next to the embodiment which compensates, using a compensation value, the result of a combination process performed with respect to the reception timing samples. Depending on a measurement environment, there are cases where the average value of positioning errors does not converge on zero even when the number of times of measurement is increased. Therefore, compensation is performed with respect to the result of the combination by using the average value obtained preliminarily from the results of measurement as the compensation value. A description will be given herein below by using the process flow of FIG. 13.

Each of the access points accumulates measurement signals in Step 700. If the number of times of measurement is less than m at this point of time, the sequence advances to Step 703 where the time, the position, or the frequency in use is changed and then the measurement of reception timing samples is performed again. After the measurement is performed m times, a delay profile is created in Step 701 based on the measurement signals and reception timing samples are measured in Step 702 based on the delay profile. Then, the m reception timing samples are averaged in Step 704 to provide the result of the combination by finally applying the compensation value to the result of the averaging process in Step 705.

Since the compensation value has the possibility of varying depending on the environment in which the access point is disposed and on the position of the station, it is preferable to adopt a method which predetermines the compensation value through measurement in each environment in which the access point is disposed and applying the compensation value in accordance with the environment at the time of operation.

The compensation value may also be estimated by using a plurality of reception timing samples that have been measured. In this case, a numerical expression for the correspondence between the variance value of the reception timing samples and the average value thereof is predetermined from the results of measurement or the like. The numerical expression for the correspondence is obtainable by plotting the variance value and the average value onto a two dimensional plane and determining the approximation function thereof. If the approximation function is assumed to be a linear function, e.g., it is represented by $a=p \times v+q$ (p: gradient, q: intercept) where a is the average value and v is the variance value. In this case, the values p and q vary depending on the environment in which the positioning system is disposed.

Figure 14:
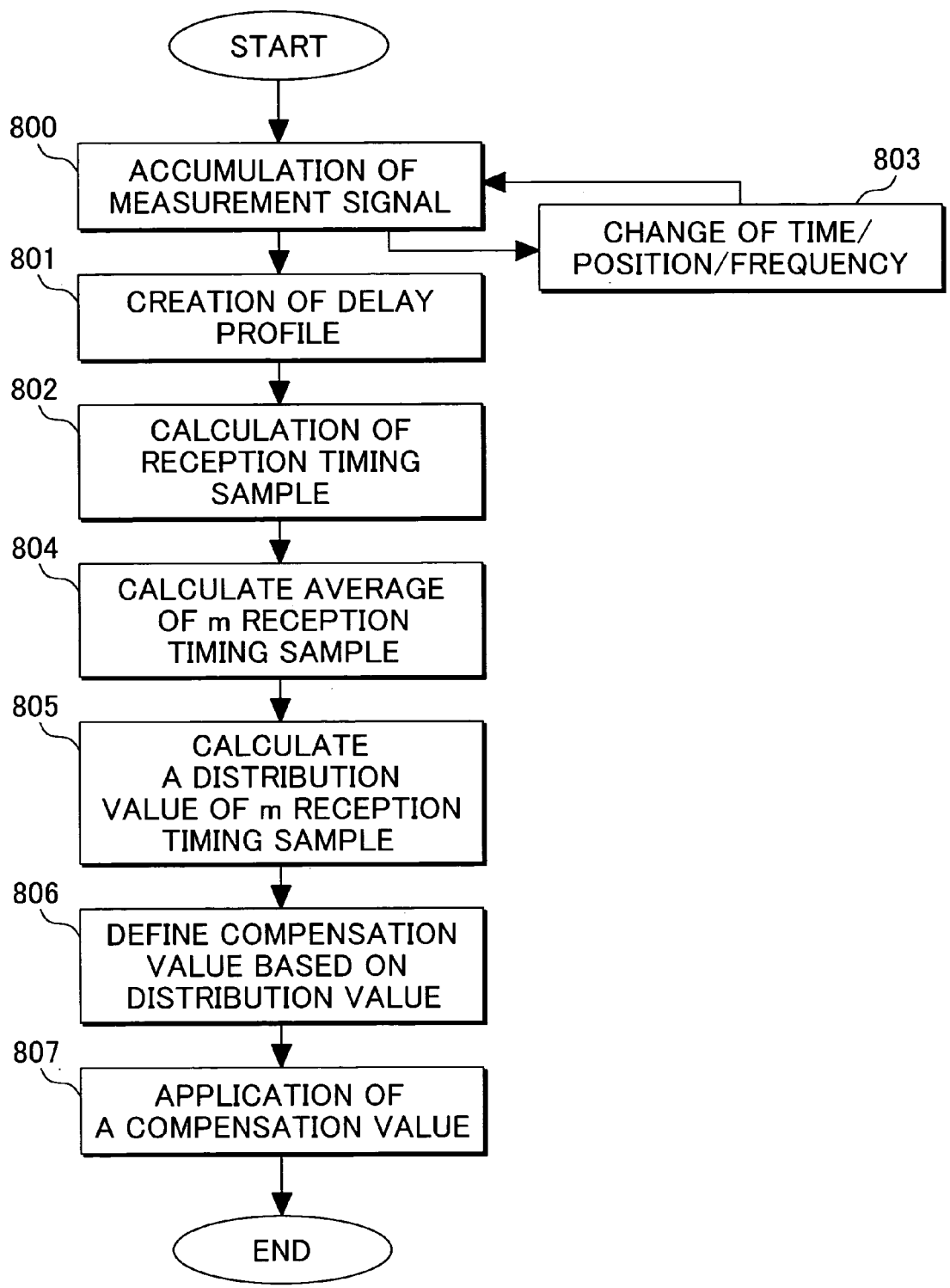
FIG. 14 is a flow chart of a process for determining a compensation value based on a variance value.

A description will be given herein below to a method which uses the variance value of m measurement values. FIG. 14 is a flow chart of a process considering weighing.

Each of the access points accumulates measurement signals in Step 800. If the number of times of measurement is less than m at this point of time, the sequence advances to Step 803 where the time, the position, or the frequency in use is changed and then the measurement of reception timing samples is performed again. After the measurement is performed m times, a delay profile is created based on the measurement signals in Step 801, reception timing samples are measured based on the delay profile in Step 802, and the m reception timing samples are averaged in Step 804. Next, the variance value of the m reception timing samples is determined in Step 805 and the compensation value is determined by using a numerical expression for the correspondence between the variance value and an error value in Step 806. Finally, the compensation value is applied to the result of the averaging process in Step 807 to provide the result of the combination.

Figure 15:
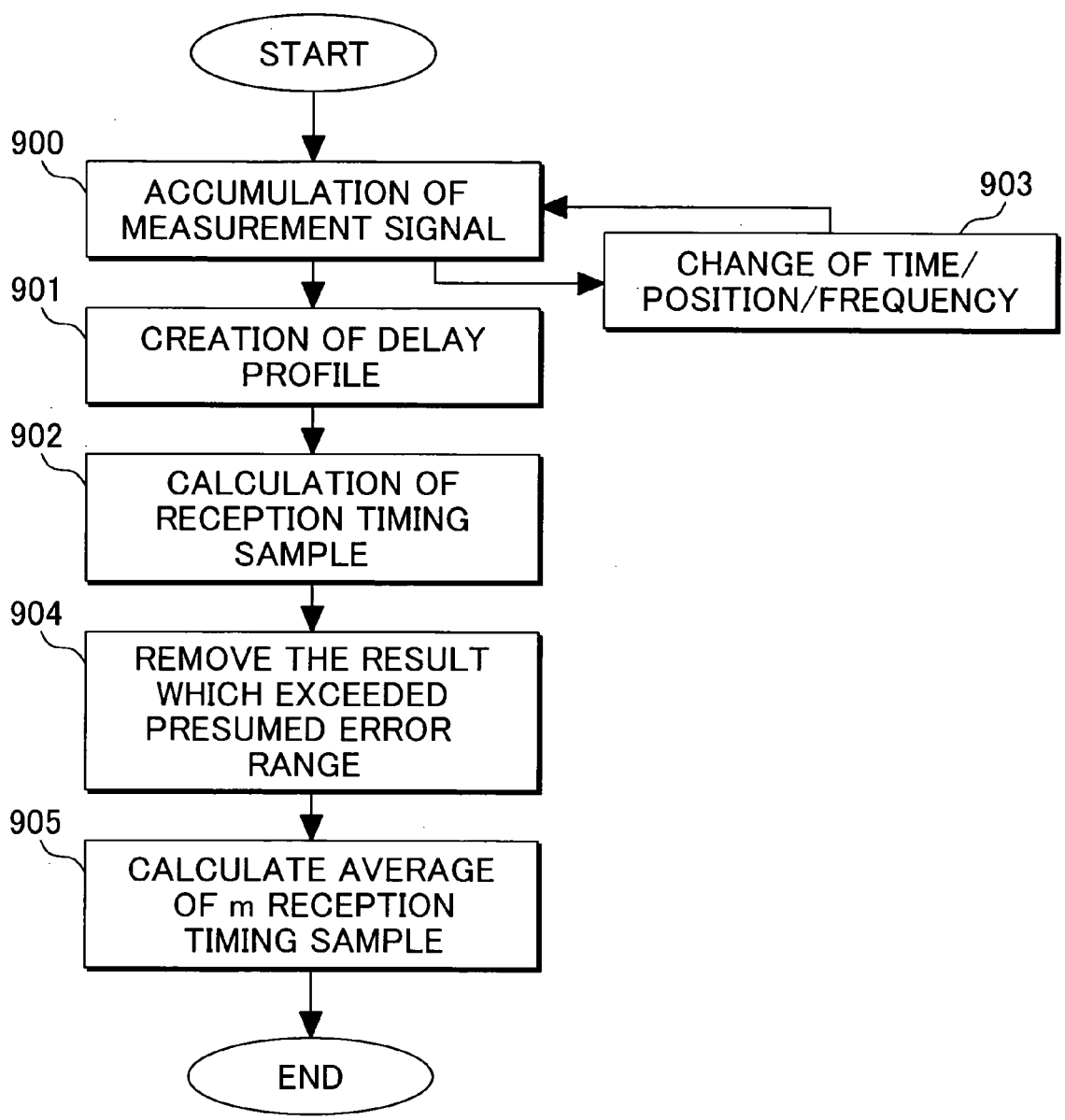
FIG. 15 is a flow chart for a process which excludes a result, with a large error.
Figure 16:
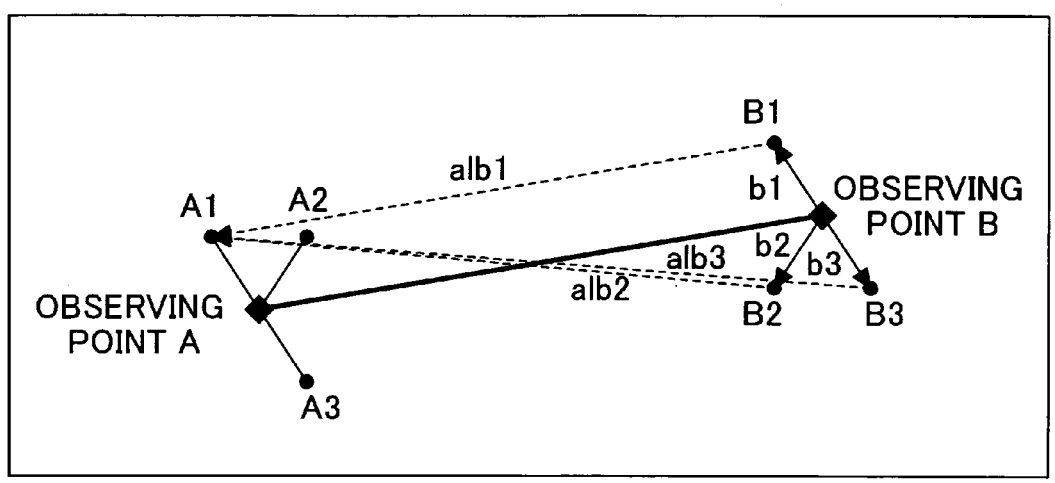
FIG. 16 is a view showing an example of averaging the result of a GPS measurement.

A description will be given next to the embodiment which excludes that one of the reception timing samples considered to contain a large error such that it is not used for the combination process with reference to the process flow chart of FIG. 15.

Each of the access points accumulates measurement signals in Step 900. If the number of times of measurement is less than m at this point of time, the sequence advances to Step 903 where the time, the position, or the frequency in use is changed and then the measurement of reception timing samples is performed again. After the measurement is performed m times, a delay profile is created in Step 901 based on the measurement signals, reception timing samples are measured in Step 902, and the result of measurement exceeding an estimated error range is excluded from the reception timing samples in Step 904. In Step 905, the average value of the unexcluded reception timing samples is calculated to provide the result of the combination. As an example of a specific method for determining a value exceeding the error range, there can be considered one which predetermines the distribution of a sufficiently large number of results of measurement (reception timing samples) and excludes the result of measurement in Step 902 if it exceeds the standard deviation $2\sigma$ of the distribution.

Figure 18:
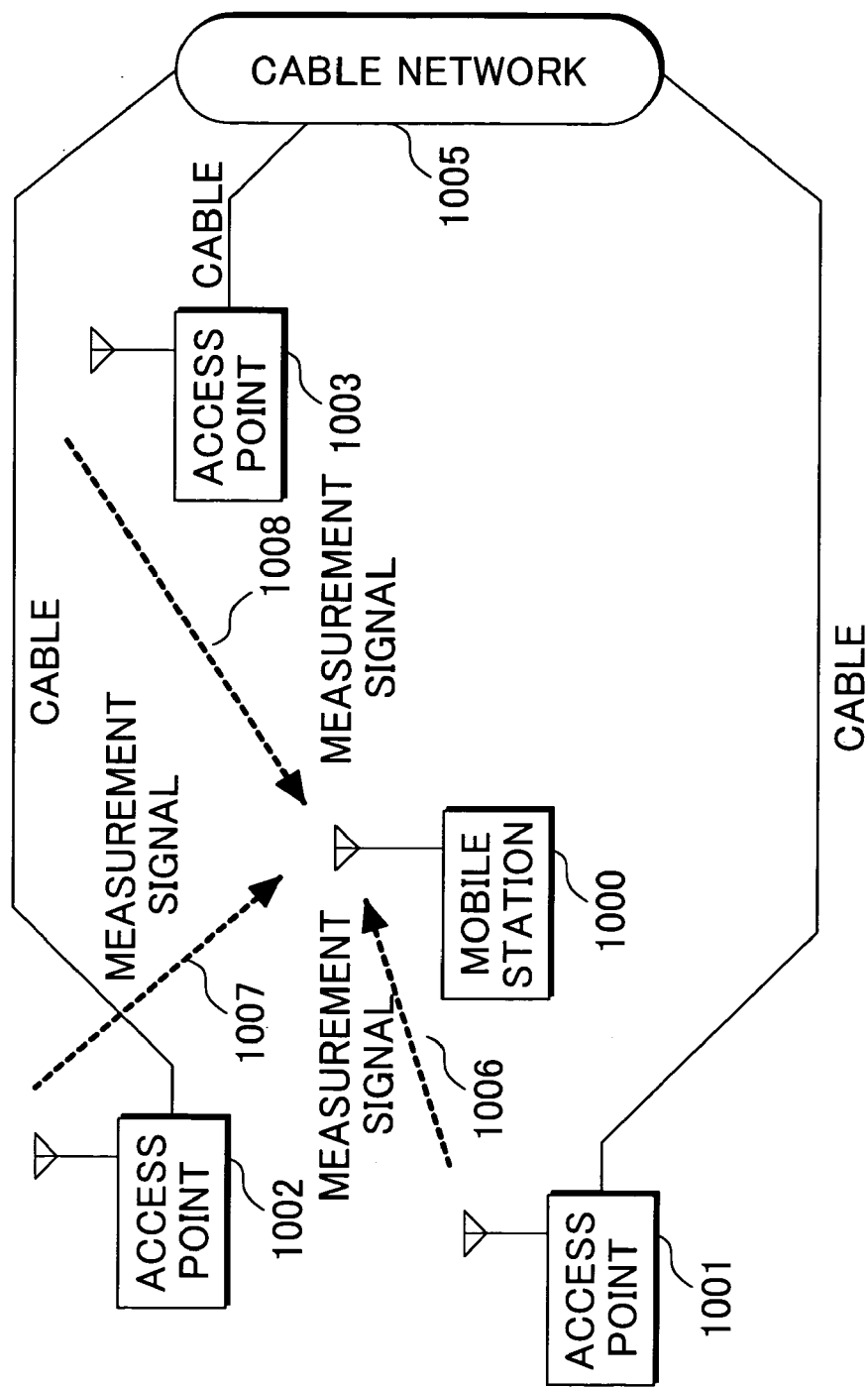
FIG. 18 is a view showing an example of a structure of a system in the case of sensing a position by using a downstream signal.

Next, a description will be given to the embodiment which senses the position of the station by using a downstream signal with reference to FIGS. 18 and 19. FIG. 18 is a view showing the entire system and a signal flow. It is assumed that access points 1001, 1002, and 1003 have preliminarily been synchronized.

The individual access points successively transmit measurement signals to a station 1000. The station 1000 receives the measurement signals 1006, 1007, and 1008 in succession and measures the reception timing samples thereof. In the case of performing diversity receiving, each of the access points switches any of the time, the antenna in use, and the frequency, while the station also changes any of the time, the position of the station, and the frequency. Thereafter, the measurement signals are transmitted again from the individual access points and received by the station to be accumulated therein. After the measurement is performed m times, the station performs a combination process with respect to the reception timing samples, obtains the time difference of arrival from the combined reception timing, and calculates the coordinates of the station.

Figure 19:
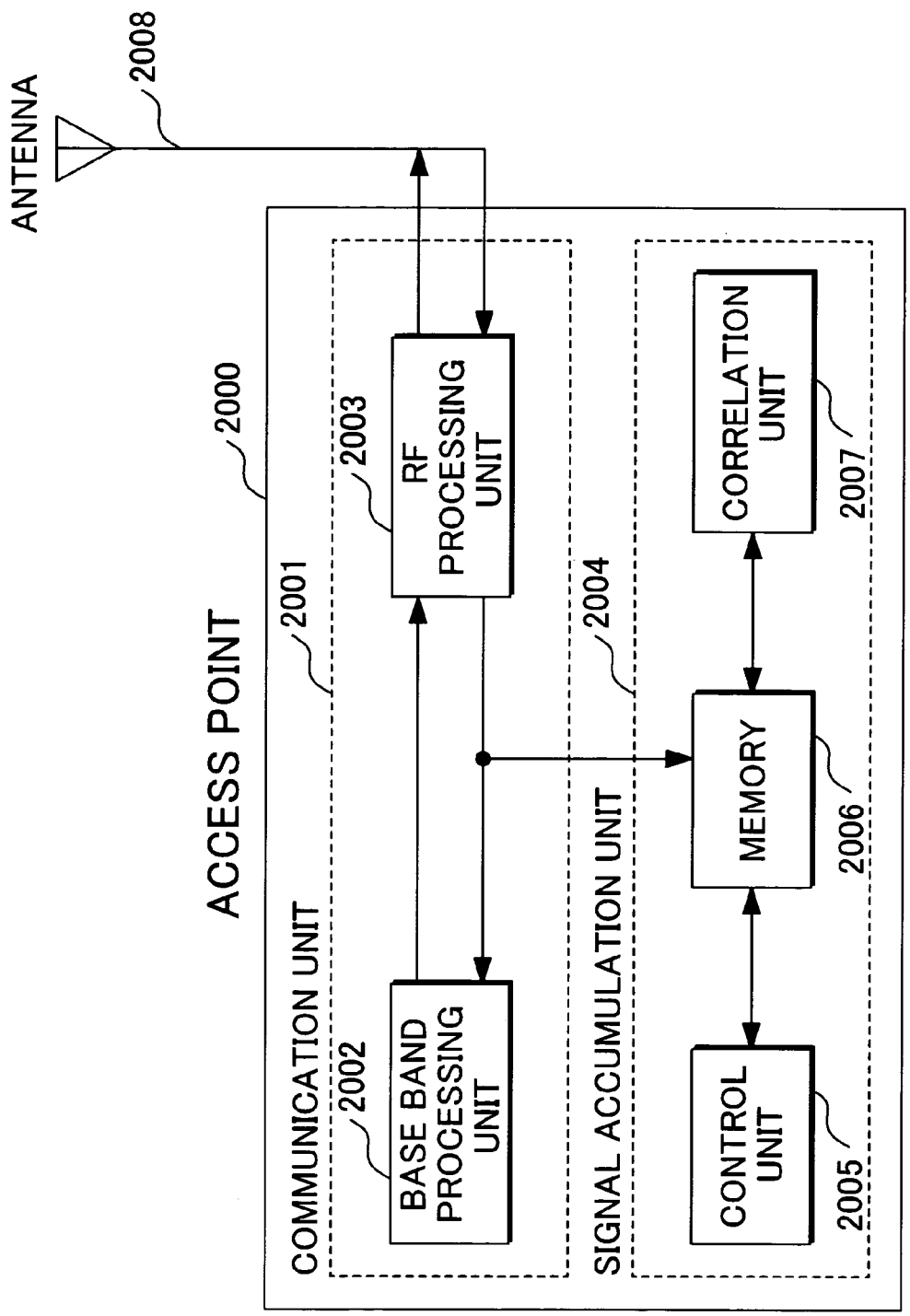
FIG. 19 is a view showing an example of a structure of a station in the case of sensing the position by using the downstream signal.

FIG. 19 shows a structure of the station in the case of using a downstream signal. The station accumulates a plurality of measurement signals in a memory 2006. A correlation unit 2007 creates delay profiles by using the individual measurement signals A control unit 2005 measures reception timing samples based on the individual delay profiles. The control unit 2005 also performs a combination process with respect to the individual reception timing samples and calculates a combined reception timing.

Since the results of measuring reception timings are generally varied by a factor such as time or an environmental change, the results of measurement with reduced errors can be obtained by accumulating a plurality of reception timing samples and calculating the average value thereof as in the present invention. In addition, by performing measurement while varying the time, the position, or the frequency, measurement signals that have passed through different propagation environments are obtainable and the effect of the averaging process is further enhanced.

In the averaging process using weighing described above, a large weight is added to a signal on a high reception level or to a signal having a correlation value, the waveform configuration of which is closer to an ideal waveform configuration. Since it can be considered that such signals are less susceptible to the influence of the multipath, enhanced accuracy is achievable by adding a large weight thereto in the process of averaging the reception timing samples.

If the error does not converge on zero depending on a propagation environment even when the averaging process is performed, the error can be brought closer to zero by applying the average value of errors as the compensation value to the result of the combination. By determining the compensation value in accordance with the variance of reception timing samples, a proper compensation value in accordance with the measurement environment which varies from time to time can be determined. This enhances the accuracy of the result of averaging the reception timings. Thus, the present invention can achieve a reduction in the influence of the multipath, which is a major factor in increasing a measurement error, and higher-accuracy positioning of a station in a positioning system in a wireless communication system.

What is claimed is:

1. A positioning method, in a wireless communication system including a station and a plurality of access points, for calculating a position of said station based on reception timings of signals transmitted between said station and each of said plurality of access points, said positioning method comprising the steps of:
   measuring, for each of the access points, a plurality of reception timings for a plurality of signals transmitted between the access point and the station; and
   determining a reception timing to be used for positioning calculation based on said plurality of reception timings, for each of the access points,
   wherein the reception timing to be used for said positioning calculation is determined by weight averaging each of results of measuring said plurality of reception timings in accordance with a reception level of the signal.

2. A positioning method, in a wireless communication system including a station and a plurality of access points, for calculating a position of said station based on reception timings of signals transmitted between said station and each of said plurality of access points, said positioning method comprising the steps of:
   measuring, for each of the access points, a plurality of reception timings for a plurality of signals transmitted between the access point and the station;
   determining a reception timing to be used for positioning calculation based on said plurality of reception timings, for each of the access points,
   evaluating an error in each of the reception timings that have been measured; and
   excluding the reception timing having the error exceeding a specified range, wherein
   the reception timing to be used for said positioning calculation is determined based on the reception timing having the error within the specified range.

3. A program for causing a position calculation server, in a positioning system for measuring a position of a station based on reception timings of signals transmitted from said station to each of a plurality of access points, to perform:
   a first procedure for instructing said station via any of said plurality of access points to transmit a plurality of signals to be used for the measurement of the position;
   a second procedure for receiving plural sets of reception timing information from each of said plurality of access points having received the plurality of position measurement signals from said station; and
   a third procedure for determining, from said plural sets of reception timing information received from said plurality of access points, the reception timing corresponding to each of the access points which is used to calculate the position of said station and calculating the position of said station by using the determined reception timing.

4. A program according to claim 3, wherein said third procedure includes:
   a fourth procedure for performing, for each of the access points, correlation calculation between a predetermined signal sequence and received signal information corresponding to said plurality of signals which is included in said sets of reception timing information; and
   a fifth procedure for detecting a plurality of reception timings from a plurality of results of said correlation calculation, wherein
   said reception timing corresponding to each of the access points which is used to calculate the position of said station is determined based on the plurality of reception timings.

5. A program according to claim 3, wherein said first procedure includes issuing an instruction to said station to transmit said plurality of signals at different times or at different frequencies.

6. A program according to claim 3, wherein
   each of said access points has a plurality of antennas disposed apart at a distance equal to or more than ½ a wavelength of each of the signals transmitted from said station, said program further comprising:
   a sixth procedure for instructing to each of said access points to receive the plurality of signals transmitted from said station by using the different antennas.

* * * * *